United States Patent
Hill et al.

[15] 3,675,019
[45] July 4, 1972

[54] APPARATUS FOR MEASURING THE AMOUNT OF A SUBSTANCE THAT IS ASSOCIATED WITH A BASE MATERIAL

[72] Inventors: Robert C. Hill, Santa Clara; John M. French, San Jose; Richard E. Toepfer, Campbell, all of Calif.

[73] Assignee: Measurex Corporation, Santa Clara, Calif.

[22] Filed: March 19, 1971

[21] Appl. No.: 126,209

Related U.S. Application Data

[62] Division of Ser. No. 799,784, Feb. 17, 1969, Pat. No. 3,614,400.

[52] U.S. Cl.......................250/83.3 D, 250/83.3 H, 250/210
[51] Int. Cl.......................G01n 23/00, G01n 21/26
[58] Field of Search...................250/83.3 D, 83.3 H, 210

[56] References Cited

UNITED STATES PATENTS

| | | | |
|---|---|---|---|
| 3,228,282 | 1/1966 | Barker, Jr. | 250/83.3 D X |
| 3,363,101 | 1/1968 | Oster | 250/83.3 D |
| 3,478,210 | 11/1969 | Janacek | 250/83.3 D X |

*Primary Examiner*—Archie R. Borchelt
*Attorney*—Flehr, Hohbach, Test, Albritton & Herbert

[57] ABSTRACT

A moisture gauge for paper material includes an infrared source and two detectors one of which is responsive to a wavelength of 1.94 microns which is sensitive to moisture in the paper; the other detector is responsive to 1.8 microns which is not affected by moisture. The operating point of the detector not sensitive to moisture is maintained constant by a feedback system. At the same time an impedance ratio of the two detectors provides information as to absolute moisture content. Automatic standardization of the system is also provided.

1 Claim, 11 Drawing Figures

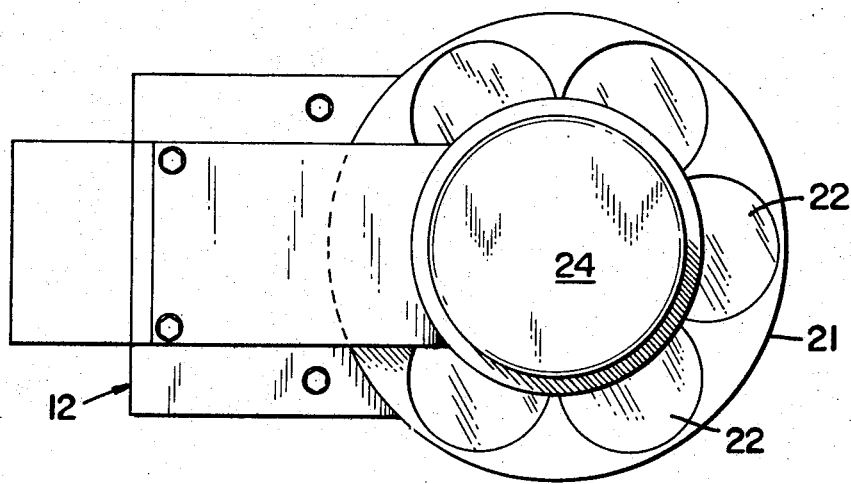
FIG_4
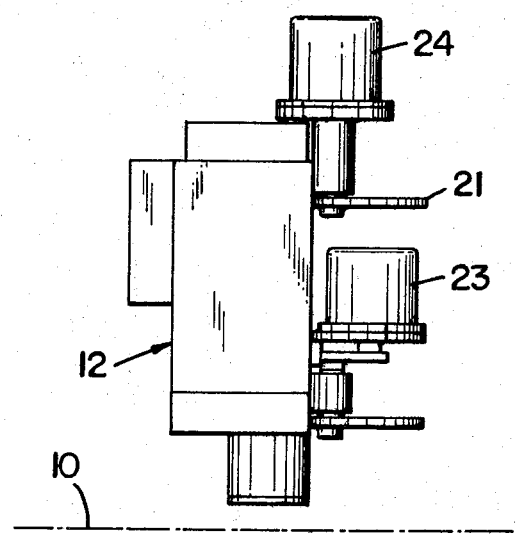
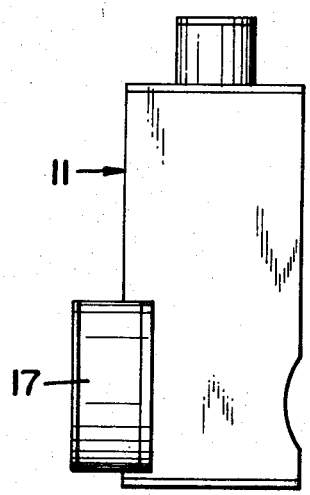
FIG_1
INVENTORS
ROBERT C. HILL
JOHN M. FRENCH
RICHARD E. TOEPFER
BY
ATTORNEYS

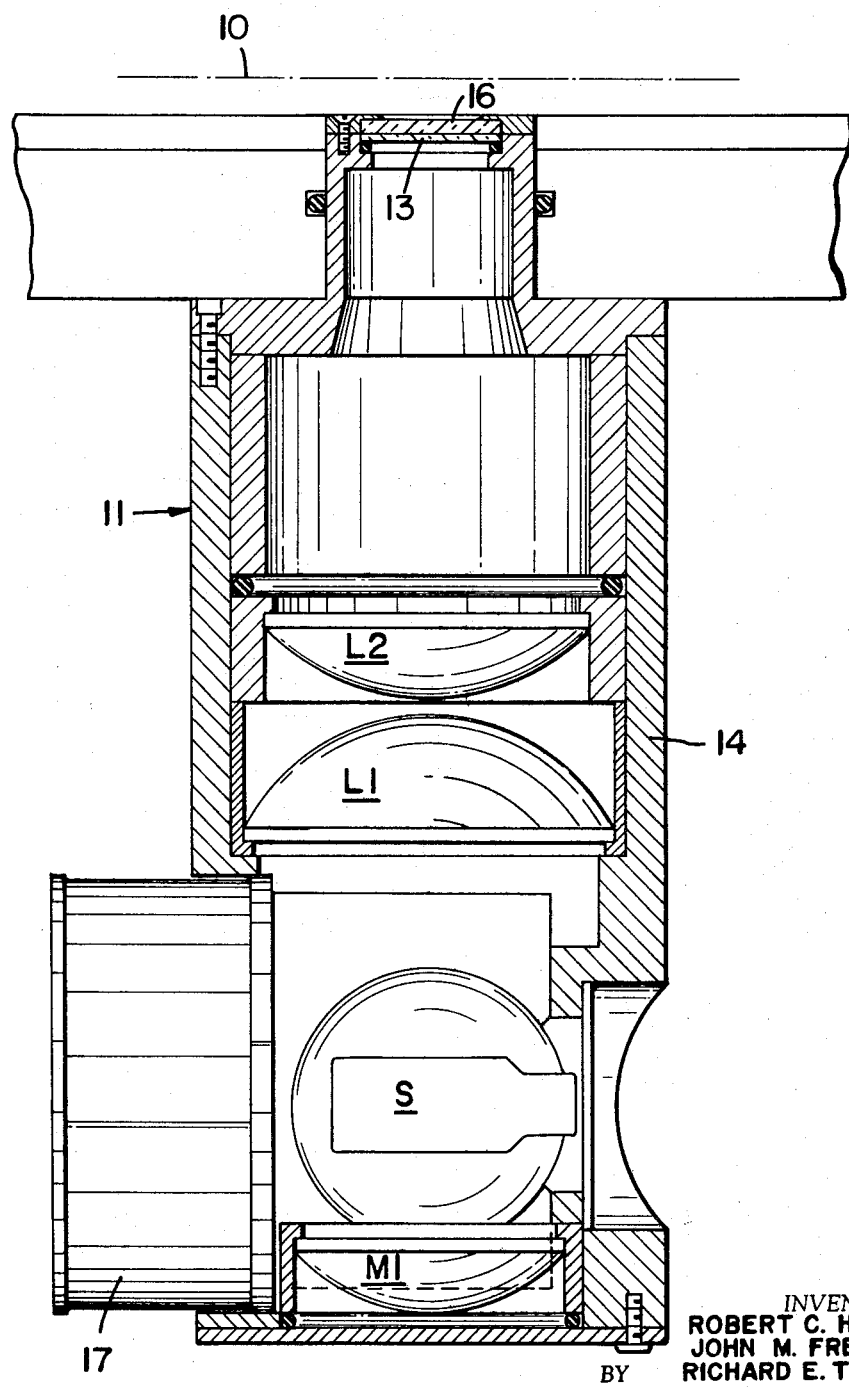
FIG_2

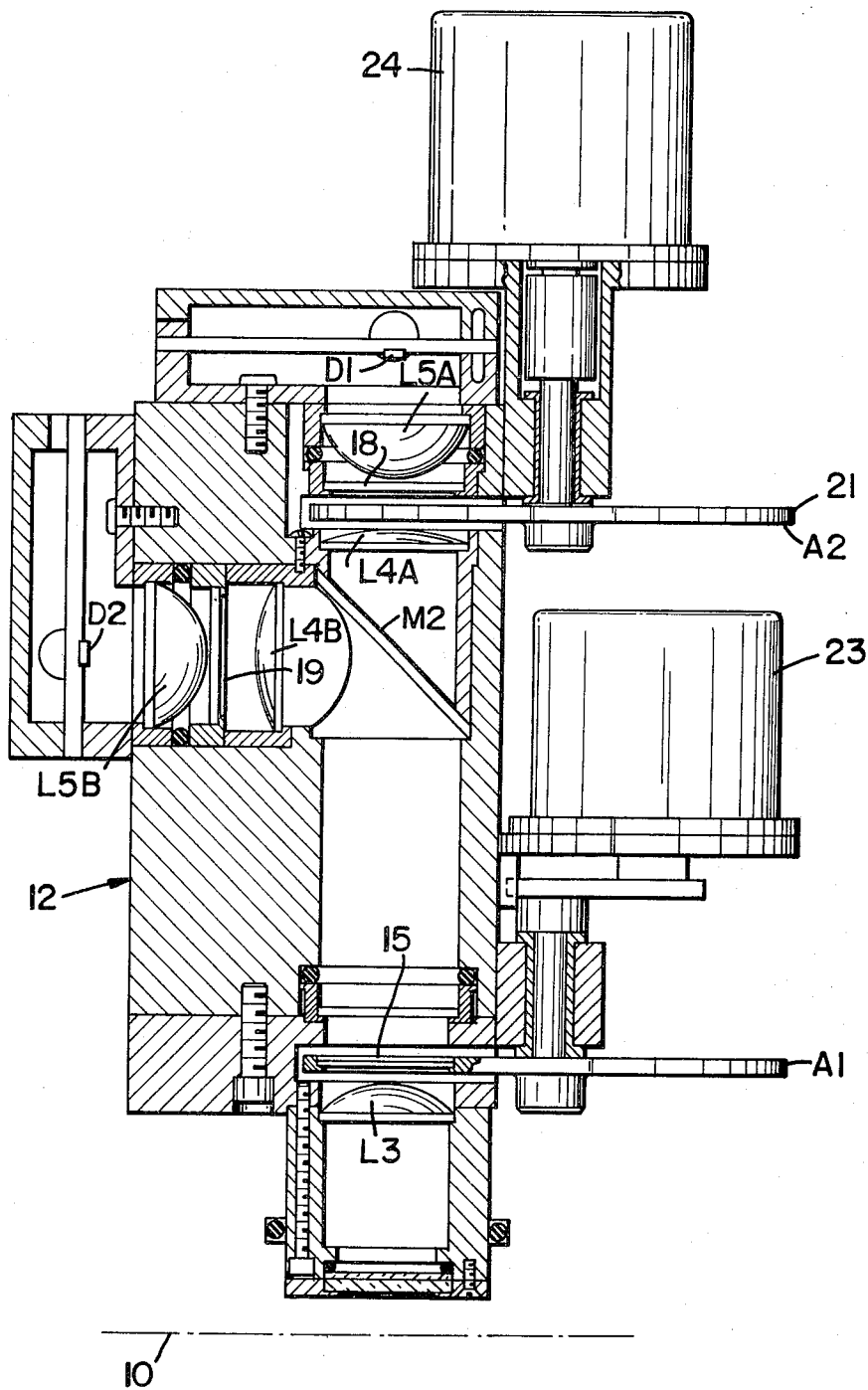
FIG_3

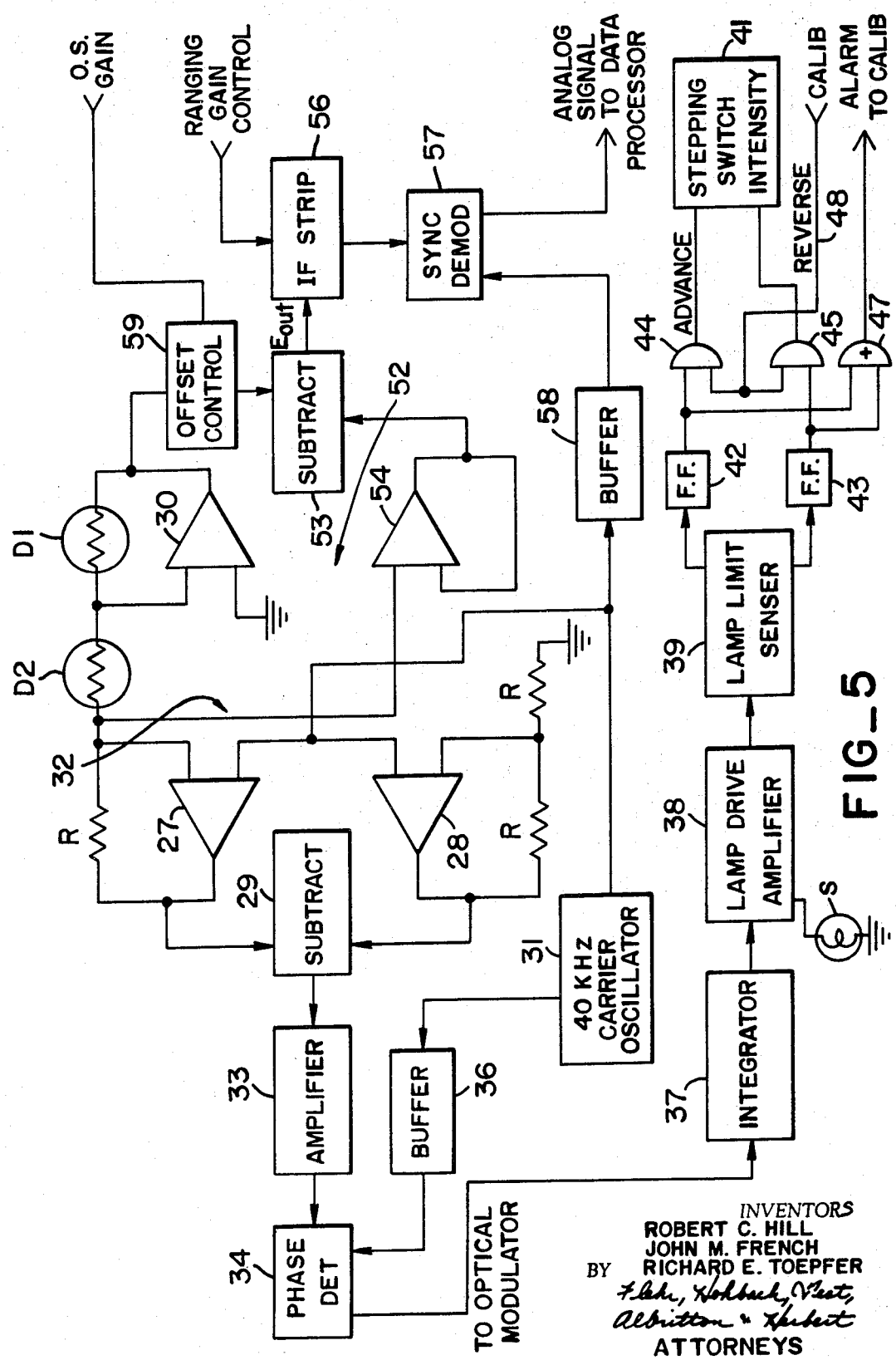
FIG_5

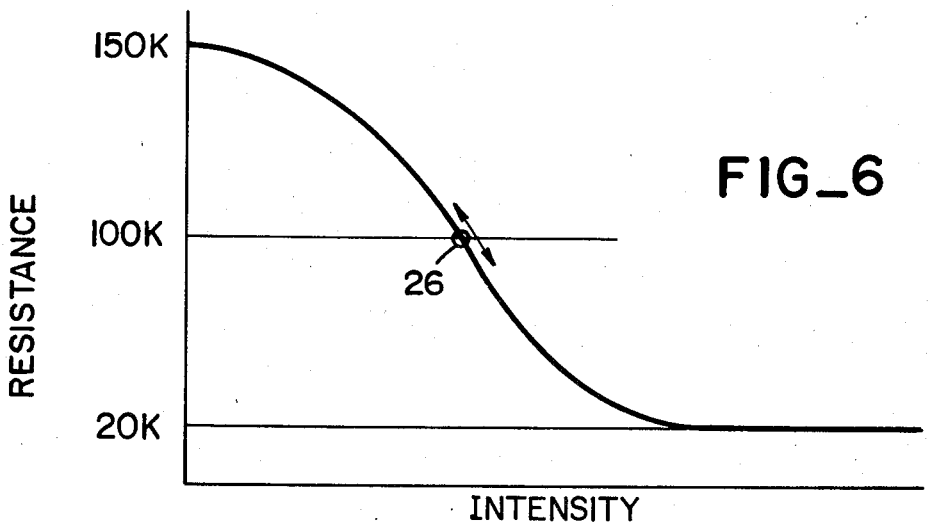
FIG_6
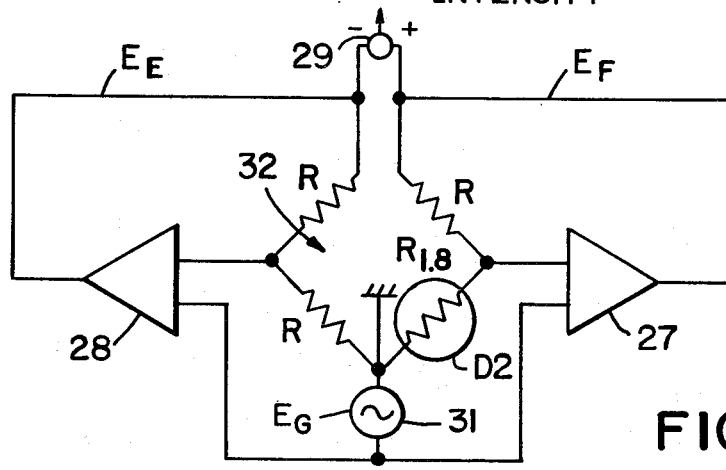
FIG_7
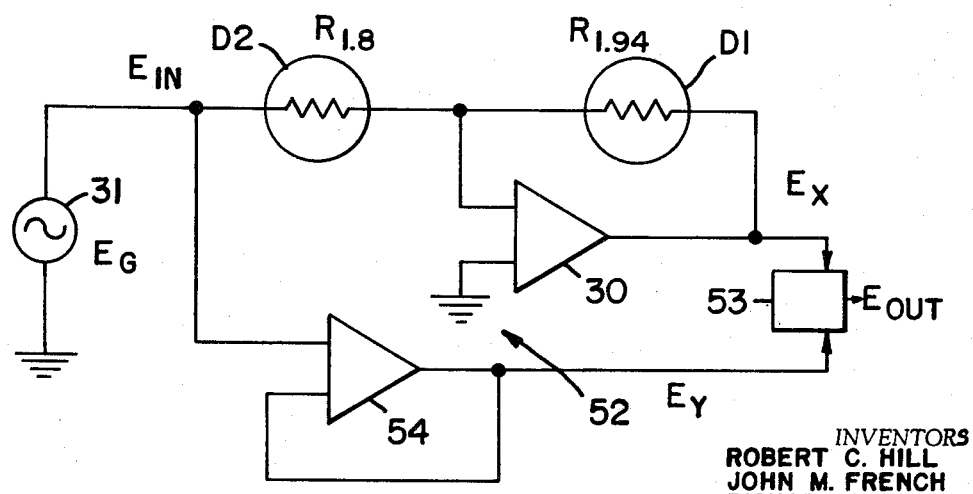
FIG_8
INVENTORS
ROBERT C. HILL
JOHN M. FRENCH
BY RICHARD E. TOEPFER
Flehr, Hohbach, Vest,
Albritton & Herbert
ATTORNEYS

FIG_9
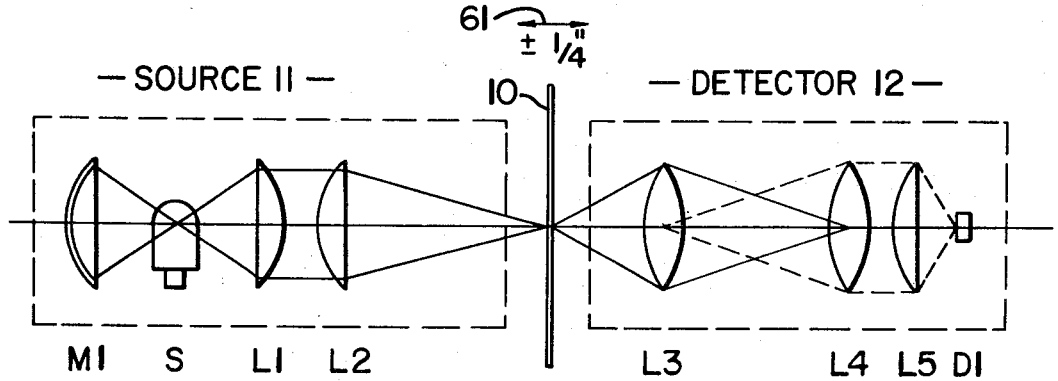
FIG_10
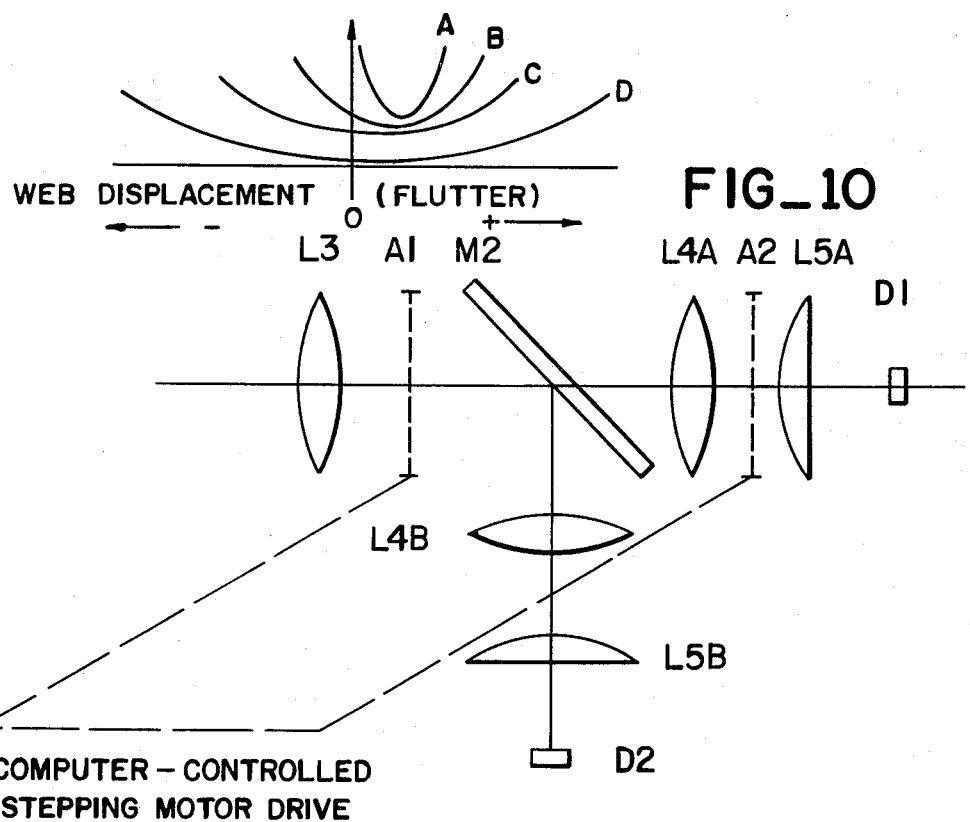
FIG_11

APPARATUS FOR MEASURING THE AMOUNT OF A SUBSTANCE THAT IS ASSOCIATED WITH A BASE MATERIAL

Cross-Reference to Related Application

This application is a division of copending application, Ser. No. 799,784, filed Feb. 17, 1969, in the names of Robert C. Hill, John M. French and Richard E. Toepfer, now U.S. Pat. No. 3,614,450.

BACKGROUND OF THE INVENTION

The present invention is directed to apparatus for measuring the amount of a substance that is sorbed by a solid material and more specifically to the amount of moisture which has been either absorbed or adsorbed by paper material such as produced by a paper making machine. It is also directed to measurement of coatings and moisture in gas streams, water in hydrocarbons, etc.

Moisture gauges for measuring the moisture content of sheet material such as paper being manufactured by a paper making machine are well known in the art. Normally the gauge includes an infrared radiation source that emits radiation in two spectral bands. The first band of 1.8 microns impinges on the paper and the amount of transmission through the paper or reflected from the paper is a function of certain parameters of the paper. It is known that in the case of a spectral band encompassing 1.8 microns this wavelength region is relatively insensitive to the moisture content of the paper. However, the radiation source also produces radiation in the spectral band including 1.94 microns which lies within the absorption band of the water or moisture contained by the paper. Thus, the amount of infrared light or radiation that passes through or is reflected at a wavelength of 1.94 microns is a function of the amount of water in the paper.

Normally the intensity of the received infrared radiation after being attenuated by the paper sheet is measured by a detector such as those of the lead sulfide type. A change in received intensity changes the impedance or resistance of the detector.

It is well known that by the use of Beer's law, which states that the amount of light that passes through or is reflected from a sheet of paper is a function of its absorption, reflection, and scatter coefficients both due to water and to paper, that an equation for water content may be derived. Such equation for deriving the weight of water includes a ratio of the resistances of the detector under the successive influence of the two different spectral bands. This equation includes exponential functions and is highly nonlinear. This nonlinearity is agravated by the fact that as discussed above there are two independent parameters in the equation; namely, that of the impedance of the detector under the influence of the 1.8-micron radiation and then under the influence of the 1.94-micron radiation. In prior devices the successive illumination of a single detector by the two different wavelengths of radiation was achieved by the use of a chopper which would cause the system to first look at the 1.8-micron or reference beam and then at the 1.94-micron or sample infrared beam.

Since the handling of a complex nonlinear equation would be exceedingly difficult if solved in its entirety, prior art devices have made approximations. In other words, linearities have been assumed which have not actually been present. Thus, the accuracy of prior devices is relatively poor.

Other defects in prior moisture gauges include the tendency of the gauge to drift due to drifts in the electronics of the circuit and changes in the infrared detector. Another defect is that the fluttering of the sheet material being measured, that is, the up and down movement of the paper toward and away from the detector, causes errors in the measurement.

Since prior gauges as discussed above make approximations as to linearity their measurement range of moisture content is quite limited. In addition, they are incapable of monitoring relatively heavier grades of paper due to compromises in optical design necessary to compensate for flutter which induces changes in intensity of the infrared beams on the detector.

OBJECTS AND SUMMARY OF THE INVENTION

It is, therefore, a general object of the invention to provide an improved apparatus for measuring the amount of substance that is associated with a base material and more specifically the amount of moisture in a sheet material.

It is another object of the invention to provide apparatus as above which is highly accurate and eliminates the effects of drift of electronics and of detectors and the effects of the flutter of the sheet material.

It is another object of the invention to provide apparatus as above which has an extended range of measurement of moisture content and is capable of monitoring relatively heavy paper grades.

In accordance with the above objects, there is provided apparatus for measuring the amount of substance that is sorbed by a solid material of the type that includes a radiation source that emits a first spectral band of radiation that impinges on the material and lies outside of an absorption band of the substance and that emits a second spectral band that lies with a resonant absorption band of the substance. Detector means responsive to the intensities of the spectral bands which are reflected from or transmitted through the material are provided which produce an electrical signal proportional to the amount of substance which is present.

Standardization means are provided which include means juxtaposed between the radiation source and the beam splitting means simulating the sheet material in a condition having substantially none or a known amount of the substance or moisture and means for juxtaposing between the second detector and the beam splitting means attenuation means simulating at least one known amount of substance or moisture to be measured. The electrical output signal caused by the maximum amount of substance is then normalized to a standard value.

BRIEF DESCRIPTION OF THE DRAWINGS

FIG. 1 is a block diagrammatic representation of apparatus embodying the present invention which scans the material to be measured;

FIG. 2 is an enlarged detailed cross-sectional view of one portion of FIG. 1;

FIG. 3 is an enlarged detailed cross-sectional view of another portion of FIG. 1;

FIG. 4 is a top view of FIG. 1;

FIG. 5 is a block circuit diagram showing the control circuitry of the present invention;

FIG. 6 is a characteristic curve of a detector used in the present invention;

FIG. 7 is a portion of the circuit of FIG. 5 redrawn in simplified form to show the operation of the circuit;

FIG. 8 is a circuit schematic of another portion of FIG. 5 also redrawn to show the operation of the circuit;

FIG. 9 is a simplified diagrammatic representation of the optical system of the present invention;

FIG. 10 are characteristic curves useful in understanding the invention; and

FIG. 11 is a simplified representation of the optical system of the present invention emphasizing certain inventive aspects.

DETAILED DESCRIPTION OF PREFERRED EMBODIMENT

As disclosed in a copending application in the names of Bossen et al. entitled "Basis Weight Gauging Apparatus, System and Method" filed Jan. 17, 1969, Ser. No. 791,972, now abandoned, a characteristic of a web or sheet material being manufactured by a paper making machine can be measured by mounting a radiation detector and a radiation source on a carriage and scanning in a cross direction over the sheet material while the sheet material is moving in a machine or perpendicular direction to the cross direction. FIG. 1 diagrammatically illustrates such a system embodying the present invention where a web or sheet material 10 is shown moving in the direction as indicated by the arrow and the web 10 is being scanned by a source 11 of infrared radiation which irradiates the underside of web 10 and transmitted radiation is then detected by an infrared detector 12 mounted on the other side of web 10. The source 11 and detector 12 would move into and out of the drawing sheet relative to the direction of web 10. Although a transmission system is illustrated in FIG. 1 the present invention is also applicable to a reflection type of system where both the infrared source and detector are on the same side of the paper, the detector sensing reflected instead of transmitted radiation.

Infrared source 11 is shown in greater detail in FIG. 2. A tungsten light source S (e.g. General Electric type Q.GA/T4DCR, 200 watts) produces radiation both in the spectral band including 1.8 microns and in the spectral band including 1.94 microns. A mirror M1 reflects radiation through condenser lens L1 and L2 through a blocking filter 13 toward web 10. All of the components of the source lens system are contained in a housing 14 which is sealed from the exterior environment by a glass window 16. A cooling fan indicated at 17 reduces the heat built up by light S. Blocking filter 13 also dissipates thermal energy thus preventing the ignition of web 10 during stoppages of the paper making machine. The lens system itself will be described in greater detail below.

FIG. 3 illustrates the infrared detector 12 in greater detail. Infrared radiation which is transmitted through web 10 is detected by detectors D1 and D2. The infrared beam is split by a multilayer dielectric mirror M2 into two beams. One beam is directed towards detector D1 and the other beam towards detector D2. The D1 detector has interposed between the mirror M2 and itself a filter 18 which is of the narrow band type and is centered around a wavelength of 1.94 microns. Thus, detector D1 is responsive to the moisture content in the web 10 as well as to the absorption characteristics of web 10. Similarly, detector D2 has its infrared beam filtered by filter 19 to allow substantially only infrared radiation in the 1.8-micron range to pass through. This wavelength is affected by the absorption characteristics of the web 10 to the identical degree as the 1.94-micron wavelength, but is unaffected by the moisture in the web 10 and, therefore, serves as as reference standard. A blocking filter 15 interposed between the web 10 and the mirror M2 prevents radiation outside the wavelength regions of interest from entering the optical system and impinging upon the defectors.

The optical system for directing the infrared beam includes an objective lens L3 and condenser lens L4B and L5B in the D2 path and L4A and L5A in the D1 path. Also, juxtaposed in the infrared beam between web 10 and mirror M2 is a variable attenuator A1 and in the infrared beam path between M2 and detector D1 a second variable attenuator A2. FIG. 4 illustrates the configuration of attenuators A1 and A2. This attenuator consists of a rotatable disk 21 having various filter portions 22 of different attenuations. Disk 21 is rotated in the case of attenuator A1 by an associated motor 23 and in the case of attenuator A2 by an associated motor 24.

Referring now to the block diagram of FIG. 5, detectors D1 and D2 are represented as resistors whose impedances vary depending on the intensity of received radiation in the particular frequency band for which the particular detector is responsive. Thus, detector D1 is indicated as being responsive to the 1.94-micron wavelength which is a measure of the moisture in the paper plus the paper itself and detector D2 1.8 microns which is equally sensitive to the paper and relatively insensitive to moisture.

Both detectors have substantially the same characteristic as shown in FIG. 6 which is a curve of intensity of received radiation versus the resistance of the detector. The detector is normally of the lead sulfide type. However, the detector need be matched only in general shape. Dark impedance mismatch can be compensated by adjustment of the associated electronics. Thermal drift mismatch is prevented by thermal stabilization techniques described below. Representative resistances are given on the vertical axis. The characteristic of FIG. 6 also aptly illustrates the difficulty in the use of such a detector in a measuring system. More specifically, the extreme nonlinearity of the curve creates errors in the system especially when the impedances of the two detectors are to be ratioed to produce an electrical signal which is indicative of the absolute amount of moisture in web 10, As is apparent from the curve, ideally it would be desirable to operate or maintain both detectors at a similar bias point indicated at 26 and operate the detector around this point in a linear portion of the characteristic. This will thus serve as a stable reference point. As will be explained below the present invention achieves this desirable effect.

In comparison, in prior art moisture gauges the measurement point on the detector characteristic was inherently unstable due to flutter in the web material. The flutter would cause the received intensity of the radiation to change and thus shift the bias point of the detector. This problem was also aggravated by the fact that measurements were successively taken by reason of the use of only a single detector with chopper means to sequentially direct the two different frequencies of infrared radiation at a single detector. Thus, at one moment, for example, when the reference measurement of 1.8 microns was taken, the bias point would be at one location on the curve and at the next moment during the 1.94-micron reading by the detector a shift in optical density of the paper or flutter of the paper sheet would change the received intensity and thus shift the operating point.

Thus, in accordance with the invention control means are provided as illustrated in FIG. 5 for maintaining constant the received intensities of the radiation in the 1.8-micron or first spectral band by controlling the intensity of the radiation sources.

Referring particularly to FIG. 5, detector D2 is part of a bridge arrangement which includes three resistors, R, operational amplifiers 27 and 28, a subtracting unit 29, and a high frequency ac signal source 31. These constitute an overall bridge 32 as illustrated in greater detail in FIG. 7. The detector D2, designated with its resistance $R_{1.8}$ is shown in FIG. 7 as being coupled directly to signal source 31 since as illustrated in FIG. 5 one side is coupled to an operational amplifier 30 having one input coupled to ground which in essence is a virtual ground to that side of the detector.

Referring now particularly to FIG. 7 the bridge functions as follows. It includes four legs, one of which includes the detector D2 and the other three resistors R of identical value. The two inputs of operational amplifier 28 are coupled across series connected reference resistor R and generator 31 designated as $E_G$. Similarly the two inputs of operational amplifier 27 are coupled across series connected detector D2 and generator 31. The other two legs of the bridge have one end respectively coupled to an input of the operational amplifiers and the other to the output of the amplifiers. These outputs are also coupled to the subtracting unit 29.

In operation the bridge circuit 32 functions to produce an error voltage at the output of subtract unit 29 whenever the resistance of detector D2 varies from the value of reference resistors R. Operational amplifiers 27 and 28 tend to maintain a 0 voltage differential between their two inputs. Thus the output voltage of amplifier 27 designated $E_F$ is determined by $$E_F = \frac{R + R_{1.8}}{R_{1.8}} E_G \qquad (1)$$

The output of amplifier 28 designated $E_E$ is given by $$E_E = \frac{R + R}{R} E_G \qquad (2)$$

Thus the total voltage on the output of subtract unit 29 is determined by the difference between the $E_F$ and $E_E$ is $$E_F - E_E = \frac{R + R_{1.8}}{R_{1.8}} - \frac{R + R}{R} E_G \qquad (3)$$

From the equation (3) it is apparent the output voltage of subtract unit 29 will be 0 if $R_{1.8}$ is exactly equal to the reference resistance R. Moreover, it is apparent from inspection of equation (3) that if the resistance of detector D2 is less than the reference resistance a error voltage of one polarity will be produced by subtract unit 29 and if greater than the reference resistance a voltage of the opposite polarity will be produced. Thus, the bridge unit 32 provides a signed indication of bridge imbalance.

Referring now to the remainder of the circuit of FIG. 5 this bridge imbalance signal produced by subtract unit 29 is amplified by amplifier 33 and coupled to a phase detector 34. The phase detector synchronized by a signal from oscillator 31 through series a buffer 36. Phase detector 34 generates a dc voltage which is representative of both the phase and magnitude of the error signal. This dc voltage is coupled to an integrator 57 which in turn is coupled to a lamp drive amplifier 38 which drives the radiation source or lamp S. Thus, the radiation source intensity of lamp S is controlled by the error signal produced by bridge 32. More specifically, the control loop includes bridge 32 in which the resistors R serve as reference means and integrator 37 which is responsive to the error signal. The use of integrator 37 provides a first order type of control loop in that there is no net error in the system. This is in comparison to a zero order system which is a positional system and where there is always some error present.

The reference resistance R against which $R_{1.8}$ is compared is determined by the detector characteristics as shown in FIG. 6 and the location 26 on the curve of FIG. 6 where it is desired to operate. Normally, this would, of course, be on a linear portion of the curve to achieve the objectives of the present invention. A typical resistance of R would be, for example, 85 kilohms.

With the control system as described above for maintaining the bias point or impedance of the detector D2 constant, the detector D1 as illustrated in FIG. 5 is also maintained at a similar point in its characteristic. The detectors D1 and D2 are both of the same type and have similar characteristics so that by control of the infrared radiation source S, detector D1 will also operate around fixed quiescent point in its characteristic. Thus, any change in received intensity due to either flutter or paper web 10 or dirt buildup or drift in electronics is immediately and automatically compensation for by the control systems associated with the bridge 32 and detector D2.

The use of a carrier system and more particularly the high frequency in the 40-KiloHertz range, for example, of oscillator 31 causes the system to operate well out of the characteristic noise of most semiconductors. This is in comparison to prior art devices in which, for example, an 18-cycle chopping rate is well within the high noise level of semiconductors. In addition, the 40-kiloHertz frequency range is ideal for semiconductor amplification.

For any specified system accuracy, Planck's Law stipulates a maximum range of operating temperatures of source S, so as to maintain the ratio of emitted energies at 1.8 and 1.94 microns constant within predetermined tolerances. In order to prevent lamp M1 from being driven beyond on its permissible range of operation a lamp limit sensor 39 adjusts the received intensity of the radiation from the lamp by control of attenuator A1 (FIG. 3). This attenuator wheel reduces or attenuates the received intensity of the lamp by fixed predetermined amounts. The rotary disk 21 of attenuator A1 is controlled by a stepping switch 41 which is actuated by lamp limit sensor 39 through flip-flops 42 and 43 coupled to AND gates 44 and 45 respectively. AND gate 44 provides for an advance in the attenuator and AND gate 45 a reverse. When the voltage limit is reached, either low or high, on lamp S, lamp drive amplifier 38 activates lamp limit sensor 39 which in turn sets flip-flops 42 or 43 to activate OR gates 42 or 43 and to activate an OR gate 47. This produces a calibrate alarm which is coupled to a central processor (not shown) which in turn commands the scanner to go off sheet and then sends a calibrate signal on a line 48 to AND gates 44 and 45. Depending on the direction in which the limit has been exceeded, the stepping switch is now accordingly activated. As will be described below the entire circuit must be recalibrated when a new and different intensity filter is inserted.

As therefore discussed previously, the control system associated with bridge 32 holds the particular operating point of detectors D1 and D2 constant. Still referring to FIG. 5, detector D1 which is sensitive to the amount of moisture in the web 10 provides in combination with D2 by means of a ratio of their respective impedances, a measure of the absolute water content of the material being measured. This measurement is conducted simultaneously with the control of the intensity of the light source to maintain a constant operating point on the similar characteristics of the detectors. In other words, an absolute impedance measurement of detector D2 is being made by bridge 32 and its associated control loop while at the same time the variation of resistance of D1 is being used to make a ratio measurement to provide an electrical output signal which is proportional to the absolute value of moisture in the material.

FIG. 8 is a simplified diagram of a portion of FIG. 5 which shows a ratio bridge 52 which includes detectors D1, D2, an inverting operational amplifier 30, a subtract unit 53 coupled to the output of amplifier 30 and a unity gain buffer amplifier 54. Also included in the ratio bridge circuit 52 is oscillator 31 designated $E_G$. In operation the bridge circuit 52 produces an output voltage $E_{out}$ at subtract unit 53 which is proportional to variations in the ratio of the detector resistances D1, D2 designated $R_{1.94}$ and $R_{1.8}$. More specifically, amplifier 30 is of an inverting operational type having an output voltage $E_X$ determined by $$E_X = \frac{R_{1.94}}{R_{1.8}} E_{in} \qquad (4)$$

where $E_{in}$ is the input voltage from generator 31. The unity gain buffer amplifier 54 provides an output voltage $E_Y$ as $$E_Y = E_{in} \qquad (5)$$

Thus, the total output voltage from subtract unit 53 is $$E_{out} = 1 - \frac{R_{1.94}}{R_{1.8}} E_{in} \qquad (6)$$

From inspection of equation (6) it is apparent that the output voltage includes information as to the ratio of the impedances of detector D1 and D2 to thereby provide information indicative of the absolute moisture in the web material 10. However, with the use of the unit gain buffer amplifier 54 in combination with the inverting operational amplifier 30 the output voltage $E_{out}$ is proportional to variations in the ratio and not the ratio itself. This is achieved by subtracting out the "one" from the ratio to leave only the variation of the signal as the effective output voltage. In other words, information as to the ratio is a small perturbation about the ratio of 1. Thus, if a variation in the ratio is from 1.00 to 1.001 it is desirable to detect only the 0.001 and not the entire number itself. Subtracting out the one from 1.001 leaves only the variation of 0.001 which then can be amplified and processed accordingly. Thus, a much more reliable and accurate system is provided. In addition, it is apparent that the ratio measurement is entirely non-interacting with the previous control correction produced by bridge 32 in adjusting the intensity of the radiation source. This is achieved in part by the effective isolation of bridge circuit 32 from bridge circuit 52 by operational amplifier 30 which in the case of bridge circuit 32 provides a virtual ground. In the bridge circuit 52 operational amplifier which now takes the resistance of detector D2 into account to provide the desired ratio. In addition, by adjustment of the radiation source S the effective operating bias point on the characteristic of detector D1 has also been adjusted and maintained constant in spite of flutter and changes in optical density of web 10 without affecting the ratio measurement being conducted by bridge 52.

Referring again to FIG. 5, the output voltage, $E_{out}$, subtract unit 33 is coupled to an IF strip or amplifier 56. This amplifies the 40-kiloHertz oscillations from generator 31. Such frequency is demodulated by synchronous demodulator 57 which converts the amplitude of the carrier to a dc voltage. This amplitude is thus a direct measurement of the weight of water in the paper and is coupled to a data processor (not shown). Synchronous demodulator 57 is controlled through a buffer unit 58 coupled to oscillator 31.

The system of the present invention is self-adaptive so that it may be normalized to provide a constant range of output voltages for various weights of paper and moisture. This is achieved by gain control of both the IF strip by the input designated "ranging gain control" and by an offset gain control input to an amplifier 59 coupled between subtract unit 53 and detector D1. The offset gain control 59 allows adjustment of the quiescent or bias point of the measurement so that any portion of the detector curve characteristics can be used. Thus, for example, the system through the use of the various gain controls as described above can be standardized to produce a 0-voltage output with no moisture or substance in the material being measured and, for example, 10 volts which would correspond to some arbitrarily chosen percentage of moisture in the paper. In other words, the output voltage from the demodulator 57 to the data processor is normalized to some standard value so that the output voltage may be directly converted to a moisture indication. This indication would, of course, be absolute moisture. To provide information as to relative moisture, the basis weight measurement or the actual weight of the paper must be found by a second gauge disclosed in the above mentioned copending Bossen application which basis weight information when combined with the absolute moisture content in the data processor provides a relative moisture content.

FIG. 9 illustrates in greater detail the optical system of the present invention which has been shown in connection with the infrared source and detector in FIGS. 1, 2 and 3. The optical elements are given similar designations or legends as in FIGS. 2 and 3 with the light source S providing a source of radiation focused by condenser lens L1 and L2 on web 10. The spot of infrared light on web 10 is imaged on detector D1 by means of objective lens L3, field lens L4 and condenser lens L5. Only a single detector D1 is illustrated in the drawing. Theoretically, with proper adaptation, the present invention can be practiced with a single lead sulfide detector rather than the two detectors illustrated. This entails more complex switching and in the preferred embodiment, as will be explained in conjunction with FIG. 11, a dual beam system is used.

Web 10 has its flutter indicated by the double ended arrow 61. This flutter is normally of the range of ±¼ inch in a normal paper making machine. From an optical standpoint, flutter in web 10 causes a shift in received intensity of the infrared radiation at detector D1 as shown by the family of curves of FIG. 10. The vertical axis of the curve is an indication of the received signal strength at detector D1 of the infrared radiation and the horizontal axis is the amount of web displacement or flutter in both positive and negative directions. From examination of the curves it is apparent that as greater sensitivity or efficiency is provided by the optical system (which allows greater flexibility in the system in the measurement of heavier papers) the nonlinearity of the optical system increases. The different curves, A, B, C and D are produced by different optical geometry in the lens system including different diameter lenses, focal lengths and placement of the web 10 between the source and detector housings.

The lens system in operation produces the spectral bands of 1.8 and 1.94 microns from lamp S which is reflected by a front surface mirror M1 which reimages the lamp element upon itself. Condensor lens pair L1 and L2 reimages and magnifies the lamp element onto approximately the plane of web 10. Since the web acts as a scatterer it therefore becomes in effect a new source of energy for the detector optics. Therefore the last lens of source 11 or L2 is selected to match with the first lens of the detector system L3.

In accordance with the invention, the lens system is designed to in effect trade off optical efficiency with insensitivity to web flutter. This is, of course, made possible by the feedback control system as disclosed in FIG. 5 which corrects for changes in received intensity of infrared radiation caused by flutter. In other words, the feedback system disclosed above in essence flattens out to a certain degree a selected curve of FIG. 10 such as curve B or curve C. Thus, a curve such as B or C may be chosen which provides a lens system of greater efficiency to enable the system to measure papers of heavier basis weight and the resultant nonlinearity in the lens system is corrected by the feedback control system which adjusts the radiation source intensity. Thus, the range of operation of the present invention is greatly increased. In other words, the lens system of the present invention can be selected to provide increased sensitivity as compared to a lens system where a nonlinearity cannot be tolerated, and, for example, a flat curve D such as must be used which provides very low signal strength.

The lens system as shown in FIG. 9 of the present invention also compensates for lateral displacement of the infrared light spot formed on web 10 which is typically of ±0.050 inch. This is achieved by providing a diameter of a field lens L4 which is greater than the diameter of the image formed on it by objective lens L3 by twice the possible maximum displacement of the light spot on web 10. In other words, the effective diameter of field lens L4 is greater than the lateral displacement tolerance of the light spot on web 10. L4 is selected and located to form an image of the entrance pupil of the lens system, which is the diameter of the objective lens L3. The combination of lens L4 and condenser lens L5 then forms an image of L3 in the plane of detector D1. Thus, lateral displacements of the light spot web 10 do not produce lateral displacements of the image on the detector since the relationship of L3 and the detector D1 is fixed and the detector is actually seeing the image produced by L3 rather than the light spot on the web.

Since as discussed above the operating concepts of the present system require the detectors D1 and D2 to be operated at their optimum operating impedance, standardization means must be provided to allow different types and grades of sheet material or paper to be measured. Such standardization and calibration procedure is normally done offsheet at the end of each scan of the detector and source heads 11, 12. In general, to standardize, the level of radiation intensity must be comparable to that which is present when the gauge is actually measuring the moisture on web 10. Referring now to FIG. 11 which is a simplified schematic of the source and detector heads shown in FIGS. 2 and 3, optical attenuators A1 and A2 are inserted in the infrared beam path as indicated. More specifically, mirror M2 directs large and approximately equal fractions of the energy in the respective wavelength regions received from objective lens L3 to detectors D1 and D2 respectively. Attenuator A1 then has a filter disk 22 (see FIG. 4) that is spectrally neutral over the wavelength region of interest; that is, it encompasses the 1.8-micron and 1.94-micron wavelengths. Attenuator A1 simulates the actual paper or material being measured in its bone dry condition. The particular attenuator used may comprise a metal screen or a thin metal film deposited on a transparent substrate such as quartz. The computer processor controls the setting of attenuator A1 to insert in the optical path an appropriate magnitude attenuator to produce a level of intensity at the detectors which will approximately equal the intensity that the paper grade presently being gauged would produce while at the same time causing the lamp intensity and hence its operating temperature to also be approximately equal to the temperature which the paper grade presently being gauged would require, thus satisfying the conditions imposed by Planck's Law. Since the filter A1 is inside the detector housing it is isolated from contamination, dust, corrosion and the like.

A second attenuator A2 is juxtaposed between detector and beam splitting mirror M2 which simulates at least one known amount of moisture or substance in the material to be measured. This would be normally the maximum amount. The attenuator A2 has a variety of filters which simulate various moisture contents to thus enable the operator of the system or the computer control unit to step the attenuator disk to the proper value. If desired, a second filter in attenuator A2 may be inserted to provide a second reference moisture calibration standard, so that the normalized output can represent a range of moisture content above some arbitrary, non-zero value. This is of particular value at the so-called "wet end" of the paper making machine, where it may be desired to provide a calibrated range of moisture values from say 60 – 80 percent over the full scale of a display device, such as a recorder.

In operation the standardization system requires that the attenuator A1 be inserted to provide the proper operating range. When this is done, the system is normalized as discussed previously referring to FIG. 5 to provide a 0 output voltage, for example, from demodulator 57. This is achieved by adjustment of either the ranging gain control to IF strip 56 or the offset gain control 59 to subtract unit 53. Next the attenuator A2 is adjusted to correspond to the maximum weight or proportion thereof of water in the paper and the range output can be adjusted to, for example, a negative 10 volts. From the previous knowledge of the detector characteristics which are stored in an associated computer, the magnitude of voltage can then be compared to some precalibrated weight of water in the paper. Thus, by adjustment or normalizing even though the amount of moisture to be detected is relatively small a very low attenuation can be provided by attenuator A2 which will expand the output signal to a relatively large value to provide maximum sensitivity for very small amounts of moisture.

The above standardization procedure provides in effect two points on a curve relating $E_{out}$ to water weight. Thus any subsequent voltage output can be related to this curve. Also as discussed above, if necessary because of nonlinearity of the curve additional points can be provided.

The above standardization is provided each time the detector and source scanner heads leave the web 10 and in addition whenever the intensity of the infrared radiation reaching the detectors is adjusted by movement of attenuator A1; for example, when a load limit range device 39 causes such a movement.

Control of the temperature characteristics of detectors D1 and D2 is stabilized by the appropriate thermal detection means and control of an appropriate heater or cooler.

Attenuator A1 also provides for protection against going offsheet and the resultant flooding of the detector by the full value intensity produced by the radiation source by providing a large attenuation filter for this condition. A computer processor would normally sense the offsheet condition which is about to occur and insert the appropriate attenuator. During this time standardization can proceed automatically in the few seconds available as the scanner carrying the detector and source heads 11 and 12 reverses in direction.

Thus, the present has provided improved apparatus to, for example, measure moisture present in a paper sheet which is highly accurate and it insensitive to flutter of the paper, compensates for dust and dirt buildup and natural drifts in the electronics of the system and provides for automatic operation.

We claims:

1. In apparatus for measuring the amount of substance that is associated with a material said apparatus including a radiation source that emits a first spectral band of radiation that impinges on the material but lies outside of an absorption band of the substance and that emits a second spectral band that lies within a resonant absorption band of the substance, detector means responsive to the intensities of said spectral bands which are reflected from or transmitted through said material to produce an electric signal proportional to the amount of substance which is present, said detector means including a first detector responsive to said first spectral band and a second detector responsive to said second spectral band, beam splitting means for directing radiation from said radiation source to said first and second detectors, automatic standardization means comprising means juxtaposed between said radiation source and said beam splitting means for simulating said material in a condition having substantially none or a known amount of said substance, means for juxtaposing between one of said detectors and said beam splitting means attenuation means simulating at least one known amount of said substance to be measured, and means for normalizing to a standard value said electrical output signal caused by said known amount of substance.

* * * * *